(12) United States Patent
Fukushima et al.

(10) Patent No.: US 6,314,210 B1
(45) Date of Patent: *Nov. 6, 2001

(54) MULTIPLEXING OPTICAL SYSTEM

(75) Inventors: Ikutoshi Fukushima, Fuchu; Mitsuru Namiki, Hannoh, both of (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,341

(22) Filed: May 11, 1998

(30) Foreign Application Priority Data

May 12, 1997 (JP) .................................................. 9-120665

(51) Int. Cl.[7] .............................. G06K 9/36; G02B 27/46
(52) U.S. Cl. ........................................... 382/280; 359/559
(58) Field of Search ..................................... 382/280, 260, 382/304, 210, 211; 356/309, 328, 124.5, 125; 359/130, 131, 132, 133, 379, 558, 559, 563, 19, 29, 115

(56) References Cited

U.S. PATENT DOCUMENTS

| | | | |
|---|---|---|---|
| 3,743,423 | * 7/1973 | Heinz et al. ............................ | 356/71 |
| 4,277,137 | * 7/1981 | Upatnieks et al. ............. | 350/162 SF |
| 5,159,474 | * 10/1992 | Franke et al. ........................... | 359/29 |
| 5,786,915 | * 7/1998 | Scobey ................................... | 359/127 |
| 5,801,389 | * 9/1998 | Mizutani et al. ..................... | 250/548 |
| 5,801,390 | * 9/1998 | Shiraishi ............................ | 250/559.3 |
| 5,854,674 | * 12/1998 | Lin ....................................... | 356/237 |
| 5,926,555 | * 7/1999 | Ort et al. ............................. | 382/124 |
| 5,959,704 | * 9/1999 | Suzuki et al. ............................ | 349/9 |
| 5,959,759 | * 9/1999 | Hamada ............................... | 359/204 |
| 5,986,781 | * 11/1999 | Long ..................................... | 359/30 |

OTHER PUBLICATIONS

Mendiovic, et al., "Two–dimensional Wavelet Transform Achieved by Computer–generated Multireference Matched filter and Dammann Grating", Applied Optics, vol. 34, No. 35, Dec. 10, 1995, pp. 8213–8219.

* cited by examiner

Primary Examiner—Leo Boudreau
Assistant Examiner—Kanji Patel
(74) Attorney, Agent, or Firm—Pillsbury Winthrop LLP

(57) ABSTRACT

A multiplexing optical system capable of processing input information at high speed and with high accuracy and having an easy-to-align simplified arrangement. A parallel-beam generating device (11, 12, 13) generates an approximately parallel light beam. An input image display device has a grating member (222) which is latticed both vertically and horizontally, and a display device (22) which displays an input image. A Fourier transform lens (31) reproduces Fourier transformed images (311) of the input image by each order of diffracted light produced by reading the input image displayed on the display device (22) by the approximately parallel light beam from the parallel-beam generating device. The Fourier transformed images (311) are reproduced on a Fourier transform plane (F2) at an approximately constant pitch (p). A filter array (322) filters the reproduced Fourier transformed images (311). A lens array (33) performs an inverse Fourier transform on each filtered light beam.

18 Claims, 13 Drawing Sheets

MULTIPLEXING OPTICAL SYSTEM

BACKGROUND OF THE INVENTION

1. Field of the Invention

The present invention relates to a multiplexing optical system. More particularly, the present invention relates to an apparatus capable of performing a plurality of filtering operations simultaneously on an input image and obtaining a result of the filtering process.

2. Discussion of Related Art

In the field of image processing, frequency filtering is frequently executed to change the spatial frequency distribution of an input image for the purpose of emphasizing a part of the input image or extracting only a specific component which is obscured by noise. To perform such frequency filtering, a Fourier transformed image of the original image must be obtained. Let us express the amplitude distribution of an input image by f(x,y) and the Fourier transform $F(\mu,v)$ thereof by $$F\{f(x,y)\}=F(\mu,v) \tag{1}$$

When the Fourier transform $F(\mu,v)$ is subjected to filtering expressed by the function $H(\mu,v)$, the following relationship holds:

$$F\{F(\mu,v)H(\mu,v)\}=h(-x,-y)f(-x,-y) \tag{2}$$

where "*" represents convolution calculation.

In the above expression, $H(\mu,v)$ is the Fourier transform of h(x,y). In other words, the convolution of the input image f(-x,-y) with h(-x,-y) is the Fourier transform of the product of their respective Fourier transforms $F(\mu,v)$ and $H(\mu,v)$. However, this processing requires an exceedingly large quantity of computation. Therefore, in the case of sequential processing as in an electronic computer, it takes a long time to process data having a massive amount of information such as two-dimensional images.

Meanwhile, by virtue of its high-speed nature and parallelism, light makes it possible to obtain a Fourier transformed image of a two-dimensional image, which has a large amount of information, at a high speed which is absolutely impossible to attain with an electronic computer. By disposing a filter corresponding to $H(\mu,v)$ in a plane where the Fourier transformed image is formed, filtering in the frequency space of the image can be readily performed. Optical systems that perform such filtering are shown in FIGS. 12 and 13. It should be noted that in the following description a side where principal rays enter a lens is referred to as the "front side", and a side where the principal rays exit from the lens is referred to as the "back side".

First, the optical system shown in FIG. 12 will be explained. Light from a light source 11 passes successively through a condenser lens 12 and a collimator lens 13 to form collimated light having an enlarged beam width. The collimated light enters a lens array 14 having a focal length $f_a$. A lens 15 has a focal length $f_2$. The distance between the lens array 14 and the lens 15 is equal to the sum of the focal lengths $f_a$ and $f_2$. Consequently, light beams emanating from the lens 15 form collimated light, and the light beams are incident from various directions on an input plane F1, which is the back focal plane of the lens 15. A spatial light modulator 21 is disposed such that the read surface thereof is coincident with the input plane F1. An input image f(x,y) 211 is displayed on the read surface of the spatial light modulator 21. A Fourier transform lens 31 is disposed such that the front focal plane thereof is coincident with the read surface of the spatial light modulator 21. Therefore, each light beam from the spatial light modulator 21 forms a Fourier transformed image $F(\mu,v)$ 311 of the input image f(x,y) 211 on a Fourier transform plane F2, which is the back focal plane of the Fourier transform lens 31.

The above-described processing is carried out for each parallel light beam formed by the combination of the lens array 14 and the lens 15. Accordingly, a plurality of Fourier transformed images $F(\mu,v)$ 311 of the input image f(x,y) 211 are reproduced on the Fourier transform plane F2. A lens array 331 for performing an inverse Fourier transform on each of the reproduced Fourier transformed images 311 is placed such that the front focal plane thereof is coincident with the Fourier transform plane F2. Consequently, the input image 211 is reproduced on a reproducing plane F3, which is the back focal plane of each lens element 91 of the lens array 331. In this optical system, a variety of different filters $321H_i(\mu,v)$ (i=1, 2, 3 . . . ) are disposed for a plurality of Fourier transformed images 311 formed on the Fourier transform plane F2, and thus filtered reproduced images $F\{F(\mu,v)H_i(\mu,v)\}=h_i*f$ are formed on the reproducing plane F3.

There has also been proposed an optical system such as that shown in FIG. 13 (Dec. 10, 1995/Vol.34, No.35/Applied Optics). A parallel light beam emitted from a light source 11 reads an input image f(x,y) 221 on an input plane F1 and then enters a Damman grating 23. The Damman grating 23 is a grating with a binary transmittance which is designed so that some different orders of diffracted light have a uniform intensity. The Damman grating 23 causes diffracted light to enter a Fourier transform lens 31 at an angle unique to each order of diffraction, and the number of Fourier transformed images $F(\mu,v)$ 311 of the input image 221 which is equal to the number of orders of diffraction are reproduced for each order of diffraction on a Fourier transform plane F2, which is the back focal plane of the Fourier transform lens 31. On the Fourier transform plane F2, each of the reproduced Fourier transformed images $F(\mu,v)$ 311 is filtered by each matched filter $H_i(\mu,v)$ of a matched filter array 322 having different Fourier transforms recorded for respective filters. Further, an inverse Fourier transform lens 332 forms filtered images of the input image on a reproducing plane F3.

If each matched filter of the matched filter array 322 is a spatial frequency cutoff filter, light beams from each matched filter form convolution images at the same positions in the reproducing plane F3 by the action of the inverse Fourier transform lens 332. However, if each matched filter of the matched filter array 322 is a spatial frequency cutoff filter, a plurality of convolution images overlap each other on the reproducing plane F3, making it impossible to obtain desired images. Therefore, to prevent this problem, a holographic filter is used as each matched filter of the matched filter array 322, and a result of the convolution of the input image 221 with the filter is obtained by performing an inverse Fourier transform on −1st-order diffracted light through the inverse Fourier transform lens 332. The direction of −1st-order diffraction of the holographic filter used as each matched filter is effectively adjusted so that a plurality of reproduced convolution images do not overlap each other on the reproducing plane F3.

However, the arrangement of the first conventional optical system, which is shown in FIG. 12, needs to prepare two lens arrays 14 and 331 for producing parallel light beams different in the read direction from each other to read the input image 211 displayed on the spatial light modulator 21 and for performing an inverse Fourier transform on each Fourier transformed image 311 formed on the Fourier transform plane F2. It costs a great deal to produce a lens array with high accuracy in terms of the pitch between the lens elements and the optical performance of the lens, and it takes a great deal of effort to effect alignment for the entire optical system. Further, the whole lens array 14 must be illuminated in order to produce each parallel light beam for reading the input image 211. Therefore, it is necessary to diverge the light beam to a considerable extent by the combination of the condenser lens 12 and the collimator lens 13. Consequently, the distance between the condenser lens 12 and the collimator lens 13 increases, and it is necessary to lengthen the optical system comprising the lens array 14 and the lens 15. As a result, the entire optical system undesirably becomes exceedingly long.

The second conventional optical system, which is shown in FIG. 13, has a simple arrangement in which a plurality of parallel light beams are obtained by using the Damman grating 23. However, because each matched filter used to form a matched filter array is a holographic filter, the amount of light for forming an image filtered and reproduced on the reproducing plane F3 depends on the diffraction efficiency of the holographic filter. Accordingly, the light intensity for the image formation is very weak in the present state of art. In addition, because zero-order diffracted light after the matched filter array is distributed about a point of intersection of the reproducing plane F3 and the optical axis z, the zero-order light distributed in the center of the reproducing plane F3 must be avoided when each reproduced image is detected. Accordingly, the image of zero-order light interferes with an image pickup operation for taking a plurality of filtered images. Thus, the processing efficiency is extremely low.

The direction of propagation of a light beam after the computation by each matched filter formed from a holographic filter is determined by the incident angle of the matched filter when produced. In this regard, it is extremely difficult to determine the incident angle precisely.

SUMMARY OF THE INVENTION

In view of the above-described circumstances of the conventional techniques, an object of the present invention is to provide a multiplexing optical system which is capable of processing input information at high speed and with high accuracy and which has an easy-to-align simplified arrangement.

To attain the above-described object, the present invention provides a multiplexing optical system including a parallel-beam generating device which generates an approximately parallel light beam. The multiplexing optical system further includes an input image display device having a grating member which is latticed both vertically and horizontally. The input image display device further has a display device which displays an input image. A Fourier transform lens reproduces Fourier transformed images of the input image by each order of diffracted light produced by reading the input image displayed on the display device by the approximately parallel light beam from the parallel-beam generating device. The Fourier transformed images are reproduced on a Fourier transform plane at an approximately constant pitch. A filter array filters the reproduced Fourier transformed images. A lens array performs an inverse Fourier transform on each filtered light beam.

In this case, it is desirable to satisfy the following condition:

$$2N_{max}d \leq 1 \qquad (4)$$

where $N_{max}$ is the maximum spatial frequency of the input image displayed on the input image display device, and d is the grating pitch of the grating member.

The multiplexing optical system may have a plurality of parallel-beam generating devices which emit approximately parallel light beams which are incoherent to each other, whereby Fourier transformed images of the input image displayed on the input image display device are read out onto different regions for each of the approximately parallel light beams.

Further, it is desirable to satisfy the following condition:

$$F_{a2} \leq (1/d - 2N_{max}) \lambda F_f^2 / W \qquad (7)$$

where $F_{a2}$ is the focal length of the inverse Fourier transform lens; $\lambda$ is the wavelength of the approximately parallel light beam emitted from the parallel-beam generating device; W is the size of the input image displayed on the input image display device; $N_{max}$ is the maximum spatial frequency of the input image; $F_f$ is the focal length of the Fourier transform lens; and d is the grating pitch of the grating member of the input image display device.

The action and effect of the multiplexing optical system according to the present invention will be described below.

FIGS. 1(a), 1(b) and 1(c) are diagrams for explaining the arrangement and operation of one example of the multiplexing optical system according to the present invention. As shown in FIG. 1(a), an axis which is approximately parallel to an optical axis passing through the center of a collimator lens 13 is defined as a z-axis, and an x-axis and a y-axis are set in a plane perpendicular to the z-axis. A sectional view taken in the xz-plane is shown in FIG. 1(a).

[1] In this example, a parallel-beam generating device includes a light source 11, a condenser lens 12, and a collimator lens 13. An input image display device includes a grating member 222 having a grating pitch d in each of the vertical and horizontal directions, as shown in FIG. 1(b). The input image display device further includes a transmission type film 22 as a display device. The multiplexing optical system further includes a Fourier transform lens 31 and a filter array 322. A lens array 33 consists essentially of lens elements 331.

First, in the parallel-beam input device, the luminous flux emitted from the light source 11 is formed into an approximately parallel light beam through the condenser lens 12 and the collimator lens 13. The approximately parallel light beam is made incident on the film 22, which forms a part of the input image display device on which an input image 221 is displayed. For the sake of simplicity, the following description is given on the assumption that the optical axis of collimated light is coincident with the direction of the normal to the display surface of the film 22. The grating member 222 having a constant pitch d in each of the directions of the x- and y-axes, which perpendicularly intersect each other as shown in FIG. 1(b), is placed on the display surface of the film 22. The approximately parallel light beam incident on the film 22 reads the input image 221 on the film 22 and then passes through the grating member 222.

By passing through the grating member 222, the approximately parallel light beam is diffracted. The diffraction angle θ (the angle formed between the z-axis and the diffracted light) in the xz-plane, shown in FIG. 1(a), may be obtained as follows:

$$\sin\theta = m\lambda/d \qquad (3)$$

where $\lambda$ is the input wavelength; m is the order of diffraction; and d is the pitch of the grating member 222.

Light propagates in the directions of various orders of diffraction as expressed by Eq.(3). Among diffracted light produced by the grating member 222, the same order of diffracted light is diffracted at the same angle of diffraction; therefore, diffracted light beams of equal diffraction order enter the Fourier transform lens 31 in the form of approximately parallel beams. Because the film 22 is placed in the front focal plane of the Fourier transform lens 31, the diffracted light is converged for each order of diffraction onto the Fourier transform plane F2, which is the back focal plane of the Fourier transform lens 31. FIG. 1(a) shows the way in which −1st-, zero- and +1st-order diffracted light in the xz-plane are converged. FIG. 1(c) shows the diffracted light as observed in the Fourier transform plane F2, which is perpendicular to the z-axis. Because the grating member 222 has a constant pitch in both the vertical and horizontal directions, the pitch between the spots of each order of diffraction in the Fourier transform plane F2 is also constant in both the vertical and horizontal directions as shown by p in the figure. When the input image 221 is displayed on the film 22, a Fourier transformed image 311 of the input image 221 is formed about the spot of each order of diffraction as shown in FIG. 1(c). A plurality of Fourier transformed images 311 of the input image 221 are subjected to spatial frequency filtering for each Fourier transformed image by the filter array 322. The filtered light beams enter the lens array 33 having lens elements 331 disposed for the respective light beams to perform an inverse Fourier transform on each light beam. Consequently, a plurality of convolution images (reproduced images) 341, which are produced by performing a plurality of filtering operations on the input image 221, are obtained on the reproducing plane F3, which is the back focal plane of the lens array 33.

According to this technique, the multiplexing optical system requires only one parallel light beam to enter the input image display device, and thus alignment is greatly facilitated.

The filter array 322 placed in the Fourier transform plane F2 can use frequency cutoff filters, e.g. those which use apertures, in place of holographic filters as shown in FIG. 13. Accordingly, the plurality of reproduced images 341 do not overlap each other, and each image has a sufficiently large amount of light. In addition, there is no image reproduced on the reproducing plane F3 by zero-order diffracted light as occurs in the case of a holographic filter. Therefore, the reproducing plane F3 can be effectively utilized.

[2] Further, in order for information carried by the input image display device to be reproduced on the reproducing plane F3 without omission in the above-described multiplexing optical system, it is necessary to satisfy the following condition:

$$2N_{max}d \leq 1 \quad (4)$$

where $N_{max}$ (line pairs per millimeter) is the maximum spatial frequency of an input image displayed on the display device 22 of the input image display device, and d is the pitch of the grating member 222.

The above condition (4) will be explained below with reference to FIGS. 2(a) and 2(b), which are enlarged detailed views of a part of the multiplexing optical system shown in FIG. 1, which extends from the input image display device to the filter array 322. In FIG. 2(a), Fourier transformed images 311 of the input image 221, which is displayed on the film 22, are distributed about the spots of respective orders of diffracted light on the Fourier transform plane F2. A position corresponding to the maximum spatial frequency component $N_{max}$ (line pairs per millimeter) of the input image 221 in the Fourier transform plane F2 is away from a spot in the center of each particular order of diffraction by a distance $P_{max}$ which is given by $$P_{max} = N_{max}F_f\lambda \quad (5)$$

where $F_f$ is the focal length of the Fourier transform lens 31, and $\lambda$ is the wavelength of the light beam from the light source 11.

As will be clear from FIG. 2(a), if the distance $P_{max}$ is greater than a half p/2 of the pitch p of diffracted light, the components of adjacent orders of diffracted light overlap each other. Consequently, the components of the adjacent orders of diffracted light enter the lens array 33 together, causing stray light to occur on the reproducing plane F3. Thus, it becomes impossible to obtain a favorable image as a result of convolution. FIG. 2(b) shows an arrangement in the case of $P_{max}=p/2$. Accordingly, it is necessary to satisfy the condition of $P_{max} \leq p/2$. From this expression and Eq.(5), the following condition is obtained:

$$2N_{max}F_f\lambda \leq P \quad (6)$$

The pitch p between adjacent orders of diffraction is given by $p=F_f\lambda/d$, where d is the grating pitch of the grating member 222. From this expression and Eq.(6), Eq.(4) is obtained. Accordingly, it is necessary to satisfy the condition (4) in order to transmit all the maximum frequency components of the input image to the reproducing plane F3.

[3] It is possible to increase the number of Fourier transformed images formed on the Fourier transform plane F2 by using a plurality of coherent light generating devices, i.e. as shown in FIG. 3, a first parallel-beam generating device having a light source device 111, a condenser lens 121, and a collimator lens 13, and a second parallel-beam generating device similarly having a light source device 112, a condenser lens 122, and a collimator lens 13, and allowing approximately parallel coherent light beams generated from the coherent light generating devices to be incident on the input image display device 22 at different angles. As a result, it becomes possible to increase the multiplex level. Moreover, because the light beams generated from the first and second parallel-beam generating devices are those emitted from different light sources, i.e. the light source devices 111 and 112, the light beams are incoherent to each other. Accordingly, there are no interference fringes which would otherwise be caused by the interference between diffracted light produced by the grating as a result of reading the input image by the approximately parallel light beam from the first parallel-beam generating device and diffracted light produced by the grating as a result of reading the input image by the approximately parallel light beam from the second parallel-beam generating device. Thus, favorable images can be reproduced.

[4] Further, it is desirable that in the multiplexing optical system shown in FIGS. 1(a), 1(b) and 1(c), a light beam that forms each Fourier transformed image 311 should enter the aperture of the corresponding lens element 331 of the lens array 33 without being obstructed. Accordingly, it is necessary to satisfy the following relationship:

$$F_{a2} \leq (1/d - 2N_{max})\lambda F_f^2/W \quad (7)$$

where $F_{a2}$ is the focal length of each inverse Fourier transform lens constituting the lens array 33; $\lambda$ is the wavelength of approximately parallel coherent light emitted from the parallel-beam generating device; W is the size of the input image displayed on the input image display device; $N_{max}$ is the maximum spatial frequency component of the input image; $F_f$ is the focal length of the Fourier transform lens 31 of the Fourier transform optical system; and d is the grating pitch of the grating member of the input image display device.

FIG. 4 is an enlarged view showing a part of the multiplexing optical system shown in FIG. 1(a), which extends from the input image display device to the reproduced image 341. In to FIG. 4, diffracted light carrying information concerning all the spatial frequency components of the input image 221 is distributed around one order of diffraction. Among the distributed diffracted light, light that propagates outermost has information concerning the maximum spatial frequency component of the input image 221. Let us take notice of the maximum spatial frequency component. Light of this component that is generated from the whole area of the input image 221 is distributed at a position Pi away from optical axis of the lens element 331 in the Fourier transform plane F2, which is the back focal plane of the Fourier transform lens 31 (see the dashed lines in FIG. 4). The light beam has a width $W \times F_{a2}/F_f$ when entering each lens element 331 of the lens array 33. Therefore, the aperture size ø of each lens element 331 of the lens array 33 must satisfy the following condition:

$$2p_i + W \times F_{a2}/F_f \leq ø \qquad (8)$$

On the other hand, the aperture of each lens element 331 of the lens array 33 must be not larger than the pitch p between adjacent orders of diffraction, i.e.

$$ø \leq p = \lambda F_f/d \qquad (9)$$

$p_i$ is equal to $p_{max}$. Therefore, it will be clear from Eqs.(5), (8) and (9) that if Eq.(7) is satisfied, it is possible to obtain an optical system in which the maximum frequency components of the input image are successfully filtered without overlapping each other.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Preferred embodiments of the multiplexing optical system according to the present invention, together with specific examples thereof, will be described below with reference to FIGS. 5(a) to 11.

First Embodiment

Figure 5A:
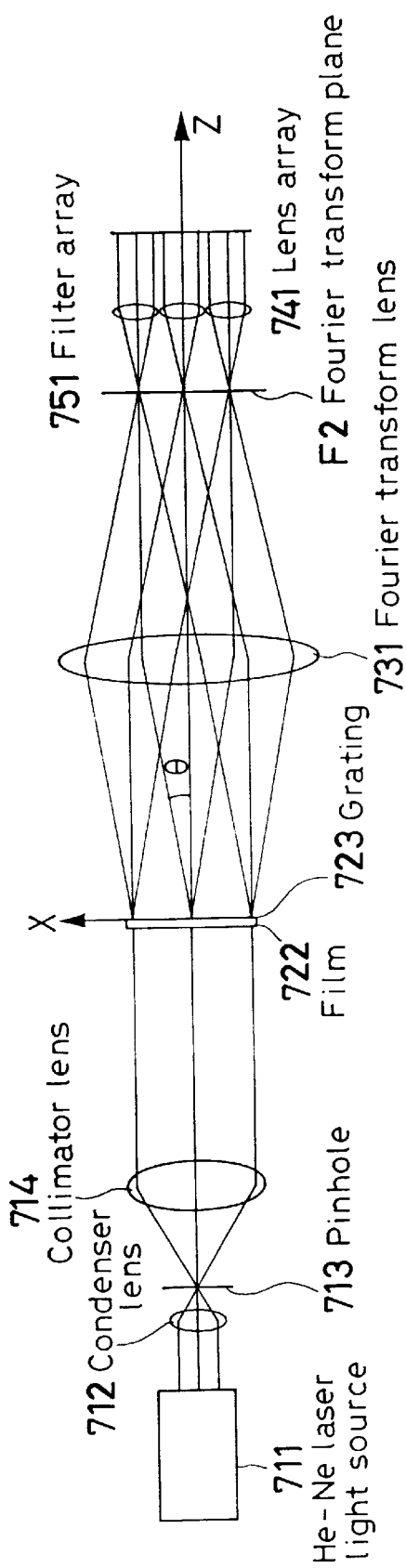
FIGS. 5(a) and 5(b) are diagrams showing the arrangement of a multiplexing optical system according to a first embodiment of the present invention.
Figure 5B:
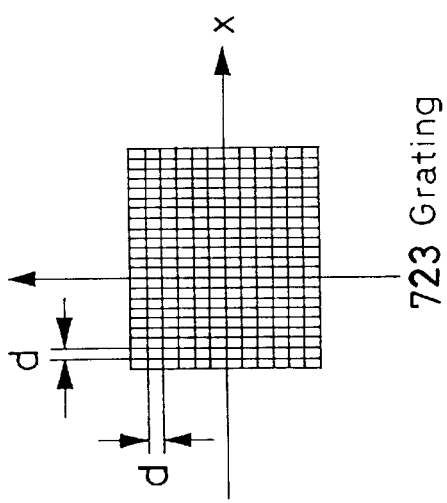

FIGS. 5(a) and 5(b) show an optical system according to a first embodiment of the present invention. As shown in FIG. 5(a), an axis which is approximately parallel to an optical axis passing through the center of a collimator lens 714 is defined as a z-axis, and an x-axis and a y-axis are set in a plane perpendicular to the z-axis. FIG. 5(a) is a sectional view of the optical system taken in the xz-plane. The optical system shown in FIG. 5(a) is a multiplexing optical system. A parallel-beam generating device includes a He—Ne laser light source 711 having an emission wavelength λ. The parallel-beam generating device further includes a condenser lens 712, a pinhole 713, and a collimator lens 714. An input image display device includes a film 722 having an image written thereon to be reproduced to form multiplex images. The input image display device further includes a grating member 723 having a pitch d in both the vertical and horizontal directions. The grating member 723 is disposed in close proximity to the film 722. As shown in FIG. 5(b), the grating member 723 is disposed such that the directions of two axes constituting the grating member 723 coincide with the x- and y-axes, respectively. In the parallel-beam generating device, a light beam emitted from the He—Ne laser light source 711 is condensed by the Icondenser lens 712 to pass through the pinhole 713 disposed in the vicinity of the focal plane of the condenser lens 712. The light beam passing through the pinhole 713 is passed through the collimator lens 714 to form an approximately parallel collimated light beam having a size sufficiently large to illuminate the whole input image. The approximately parallel collimated light beam produced by the parallel-beam generating device enters the input image display device to read the image of the film 722, on which the input image is displayed. Then, the light beam that has read the image of the film 722 passes through the grating member 723 having a pitch d in both the vertical and horizontal directions. The light beam passing through the grating member 723 is diffracted by the grating to propagate in various directions. That is, in a plane containing both the x- and z-axes and a plane containing both the y- and z-axes, the diffracted light propagates in the directions of angles satisfying the condition of θ=arcsin (mλ/d), where m is an integer. In a plane containing the diagonal direction of the grating and the z-axis, the diffracted light propagates in the directions of angles satisfying the condition of θ=arcsin(√2×mλ/d). The light beams propagating in these various directions enter a Fourier transform lens 731 with a focal length $F_f$ which is disposed such that the front focal plane thereof is coincident with the film 722.

The light beams of various orders entering the Fourier transform lens 731 perform a Fourier transform on the input image at the back focal plane of the Fourier transform lens 731 at a pitch p given by $p=F_f\lambda/d$ in each of the vertical and horizontal directions with respect to each light beam. The Fourier-transformed image is filtered by a filter array 751 disposed in the Fourier transform plane F2. In this embodiment, a Gabor filter array is used as a specific example of the filter array 751. The Gabor fitter extracts an orientation spatial frequency structure from an image, which is the identical with a band-pass spatial frequency filter having specified directivity in a wide sense. In the real space, the Gabor filter may be expressed as follows:

$$G(x,y)=\exp[-2\pi\{(x^2+y^2)(u_0^2+V_0^2)/\sigma^2\}]\times\cos\{2\pi(u_0x+V_0y)\} \quad (10)$$

In the frequency space, the Gabor filter may be expressed as follows:

$$\underline{G(u,v)}=(\sigma^2/2u_0v_0)\times<\exp[-(\pi\sigma^2/2)\{(u-u_0)^2/u_0^2+(v-v_0)^2/v_0^2\}]+\exp[-(\pi\sigma^2/2)\{(u+u_0)^2/u_0^2+(v+v_0)^2/v_0^2\}]> \quad (11)$$

Figure 6A:
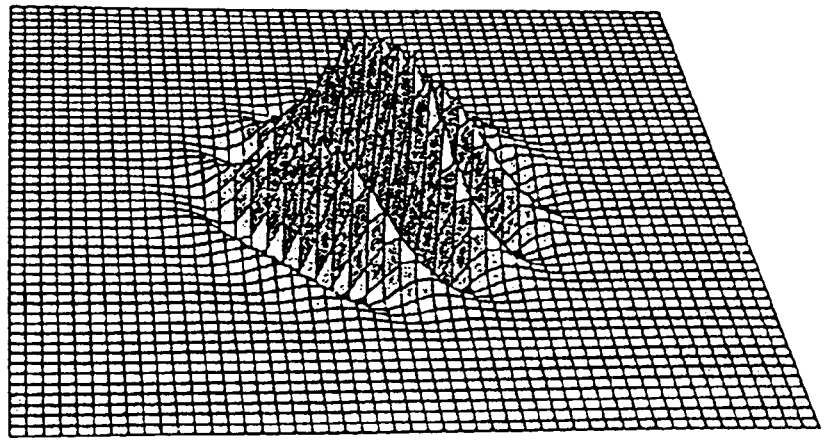
FIGS. 6(a) and 6(b) each show an outline of Gabor filter.
Figure 6B:
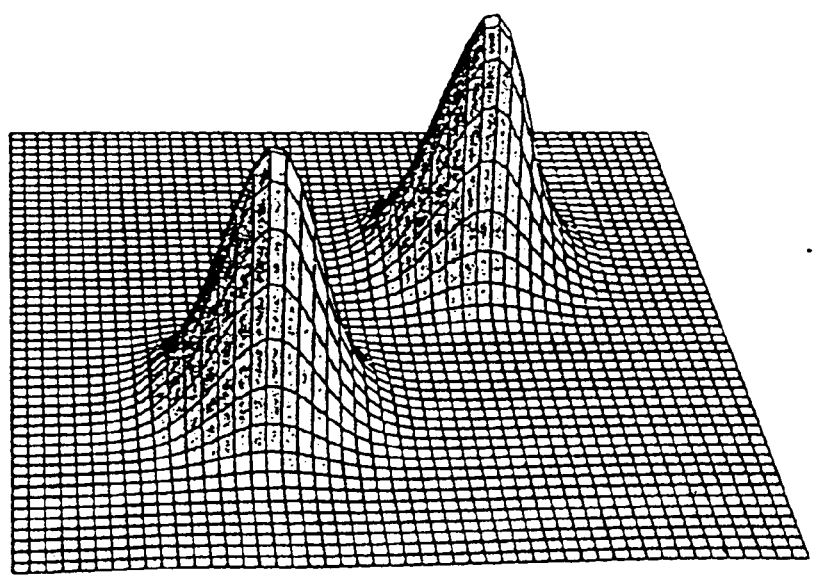

In expressions (10) and (11), x and y are coordinates in the real space; u and v are coordinates in the Fourier plane (frequency plane); $u_0$ and $v_0$ are the frequencies of vibrational components; and $\sigma$ is a variable or constant defining a Gaussian envelope. FIGS. 6(a) and 6(b) schematically show examples of Gabor filter represented by expressions (10) and (11), respectively. FIG. 6(a) shows the Gabor filter in the real space based on expression (10). FIG. 6(b) shows the Gabor filter in the frequency space based on expression (11). The filter includes negative values in the real space; in the frequency space, it includes only positive values. Therefore, it will be understood that the Gabor filter should preferably be handled in the frequency space to execute processing with the intensity of light for which only positive values can be handled in a direct manner.

Figure 1A:
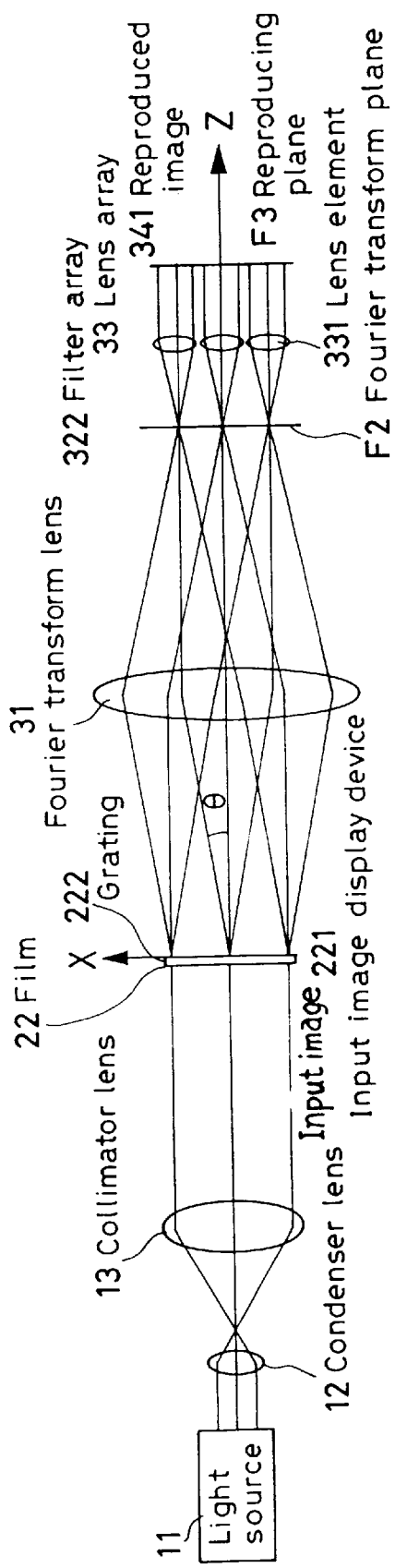
FIGS. 1(a), 1(b) and 1(c) are diagrams for explaining the arrangement and operation of one example of the multiplexing optical system according to the present invention.
Figure 1C:
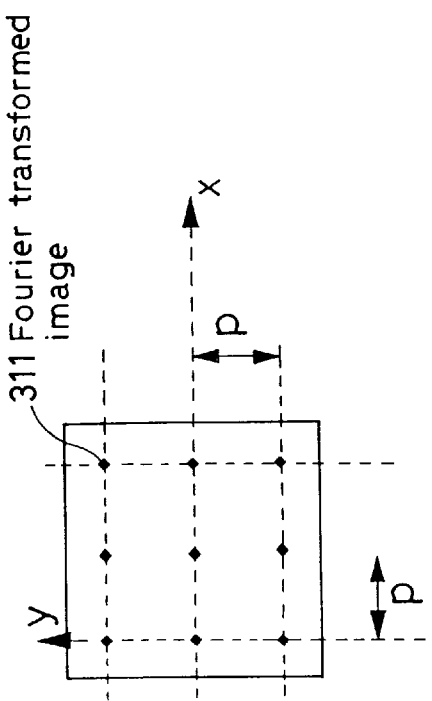
Figure 1B:
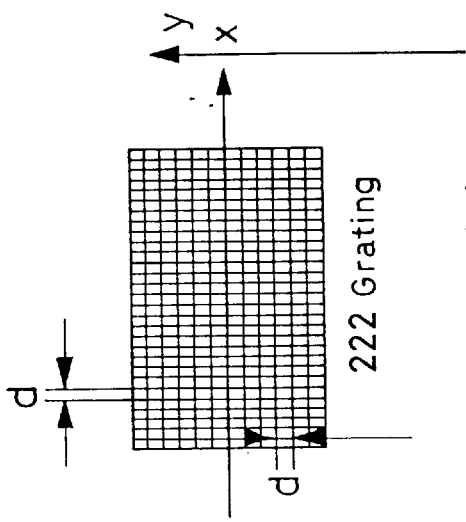
Figure 2A:
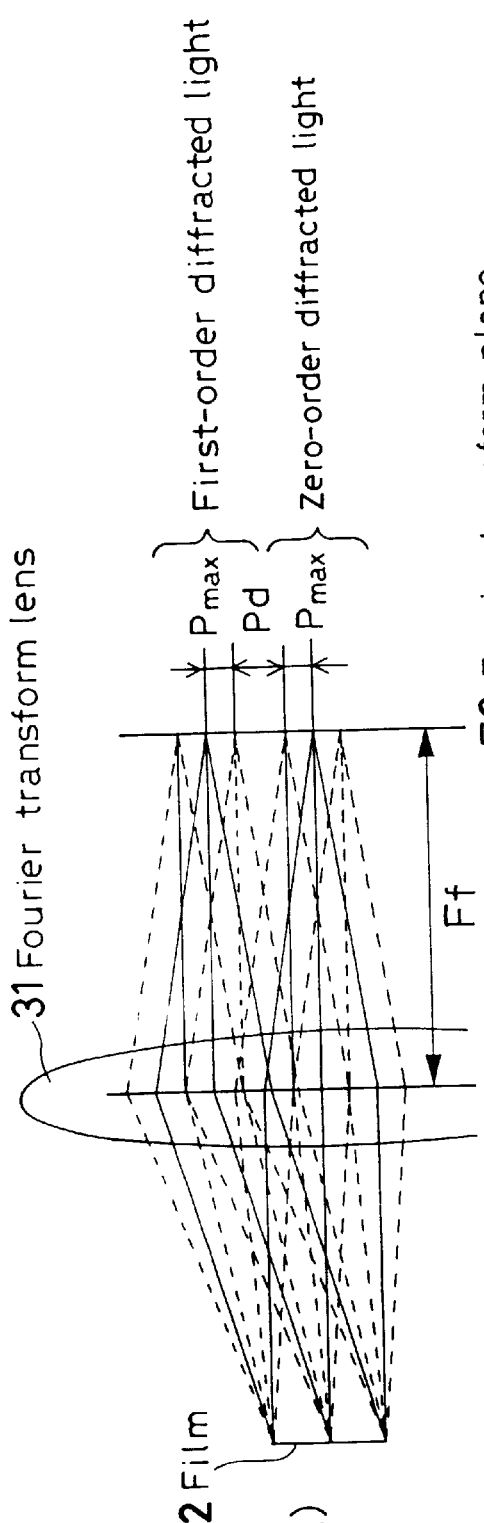
FIGS. 2(a) and 2(b) are diagrams for explaining the condition for the pitch on the diffraction order.
Figure 2B:
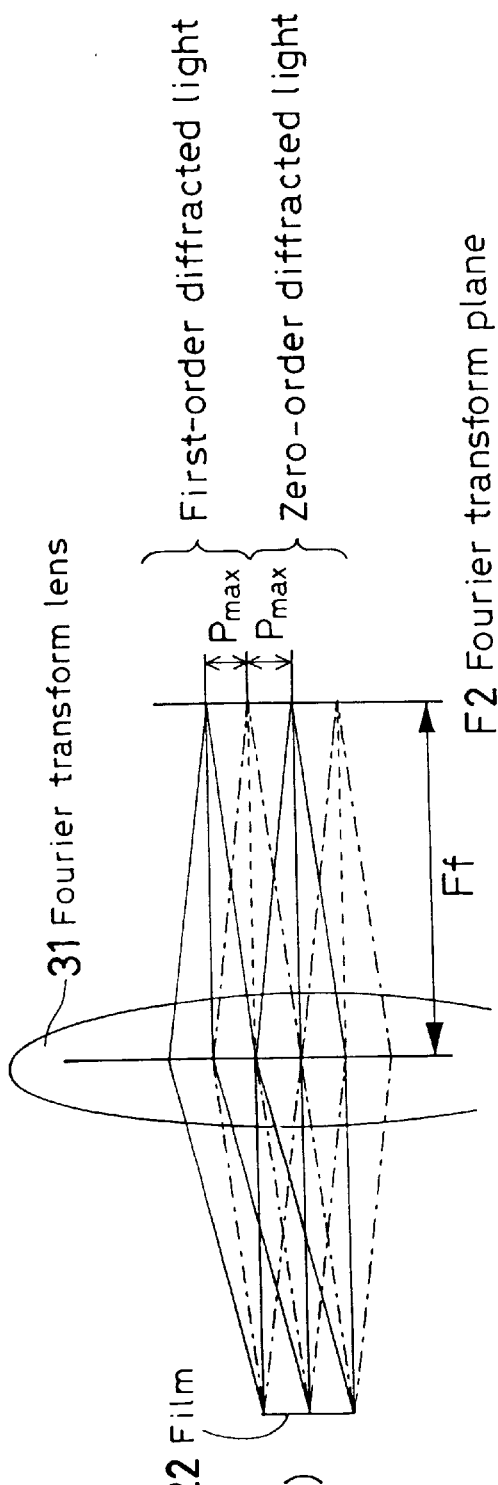
Figure 3:
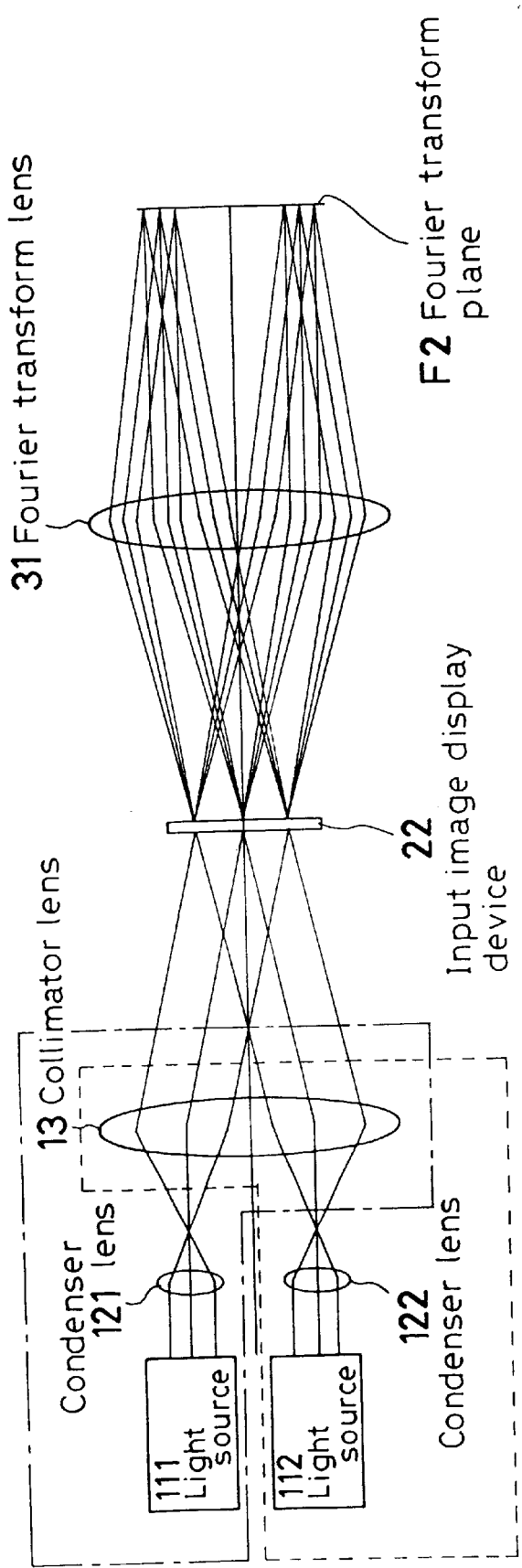
FIG. 3 is a diagram for explaining the arrangement and operation of a multiplexing optical system according to the present invention which uses a plurality of parallel-beam generating devices.
Figure 4:
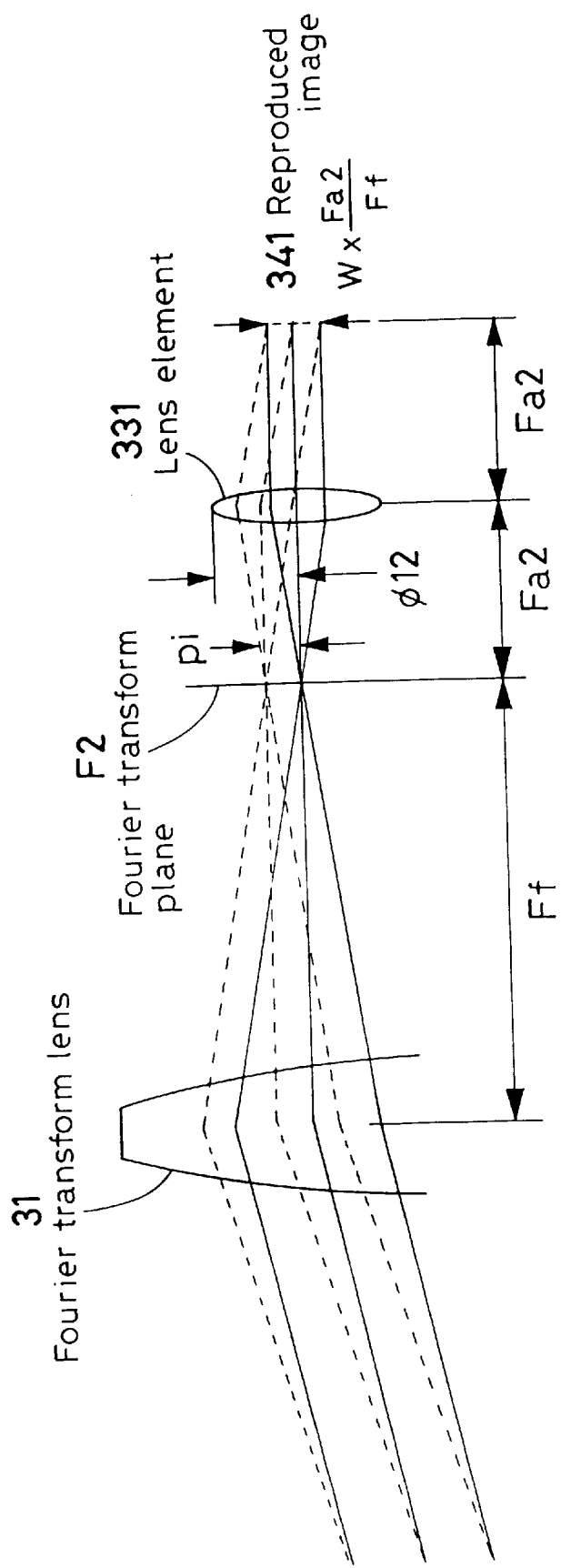
FIG. 4 is a diagram for explaining the condition for the aperture size of each lens element of a lens array.
Figure 7B:
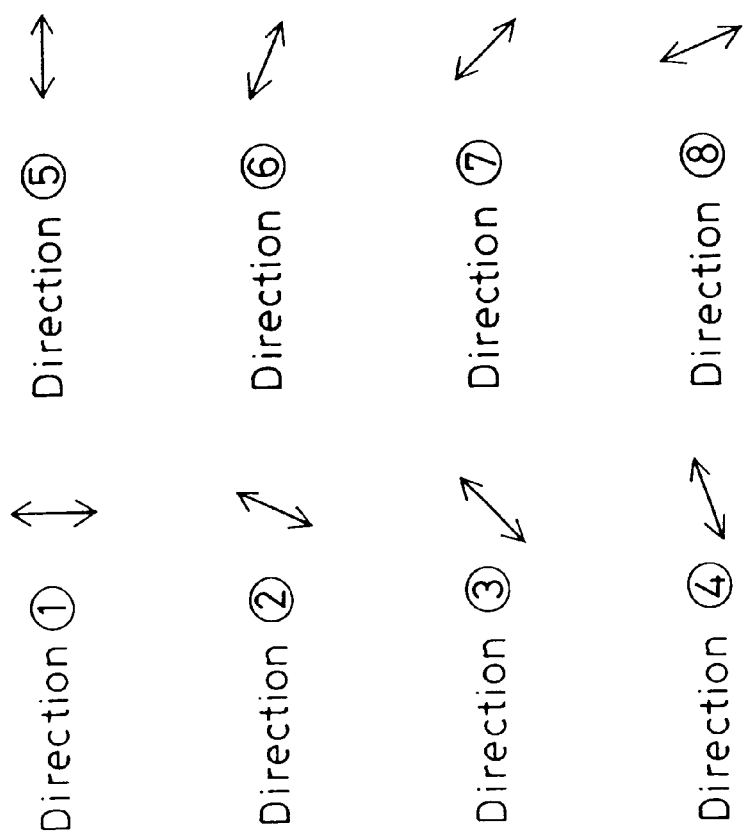
FIGS. 7(a) and 7(b) are diagrams for illustrating directions in which spatial frequency components are extracted, together with a Gabor filter array based on the extracting directions.

It was experimentally found that when the number of picture elements of the input image was $k_R \times k_R$, it was suitable to extract spatial frequency components in the range of from 0.03 $k_R$ to 0.5 $k_R$ (line pairs per input size). Therefore, in this example, a total of 9 different kinds of filters were used. That is, as shown in FIG. 7(b), with respect to each of 8 directions, i.e. u=0 (①), u=0.414v (②), u=v (③), u=2.414v (④), v=0 (⑤), u=−0.414v (⑥), u=−v (⑦), and u=−2.4141v (⑧), a filter whose spatial frequency of $u_0$ was $32\sqrt{2}$ (=45.3) line pairs per input image size was used. In addition, a filter having an aperture sufficiently large to pass all the spatial frequency components of the input image was used to refer to the input image. Accordingly, the lens and other arrays were each arranged to have a multiplex level of 9, i.e. 3 in the direction of the cross-section shown in FIG. 5(a), and 3 in a direction perpendicular to the direction of the cross-section. The actual filters were each produced such that the result of computation performed with a computer on the basis of expression (11) was outputted to a printer in the form of gray-level values and photographically reduced. In the computation, $\sigma$ was set to 2 ($\sigma=2$).

Figure 7A:
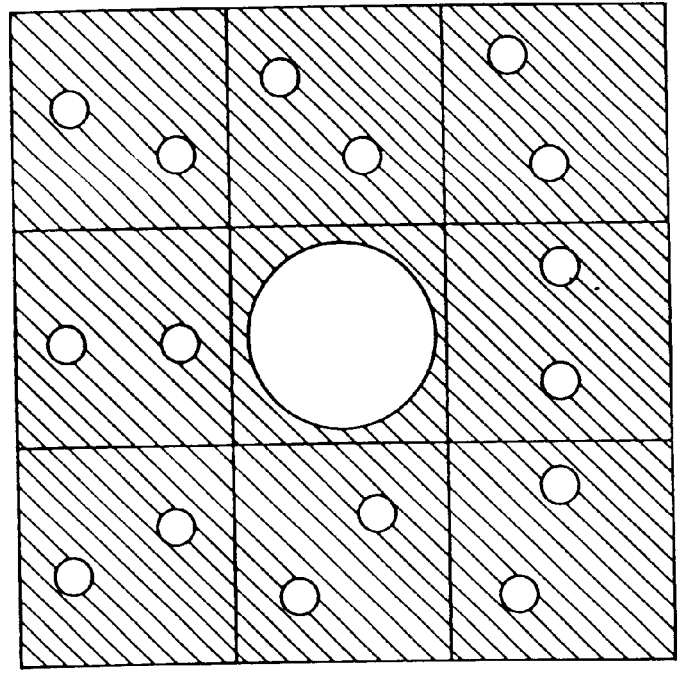

FIG. 7(a) schematically shows the filter array 751 of Gabor filters outputted to the printer in a case where the spatial frequency was $32\sqrt{2}$ (=45.3) line pairs per millimeter, as an example.

Accordingly, the Fourier-transformed image is filtered such that a part of light beams thereof are selectively transmitted. Then, the light beams enter respective lens elements of a lens array 741 which is disposed such that the front focal plane thereof is coincident with the Fourier transform plane F2, and which has lens elements arrayed at a pitch approximately equal to the pitch p of the diffracted light beams. An inverse Fourier transform is performed in the back focal plane of the lens array 741 to reproduce filtered images on the reproducing plane as a result of Gabor filtering performed on the input image.

In this embodiment, 3×3 (9 in total) lens elements are arrayed as the lens array 741, as stated above. Therefore, 3×3 filtered images are obtained.

Specific Example 1-1

A specific example for realizing a modification of the first embodiment will be shown below. As has been described above, the wavelength $\lambda$ used in this example was He—Ne laser light of wavelength 633 nanometers. The maximum spatial frequency $N_{max}$ of the input image was 5 line pairs per millimeter. The focal length $F_f$ of the Fourier transform lens was 100 millimeters. Hence, d<0.1 millimeter was obtained from Eq.(4). In this example, d was set equal to 0.05 millimeter.

The size W of the input image was 15 millimeters. As a grating member, a Damman grating, which is a phase type square grating as stated in connection with the conventional techniques, was used, and the pitch d of the grating was set equal to 0.05 millimeter. Hence, $F_{a2} \leq 4.22$ millimeters was reobtained from Eq.(7). In this example, $F_{a2}$ was set equal to 4 millimeters. Thus, it was possible to reproduce a plurality of images from the input image without any lacking information.

Second Embodiment

Figure 8:
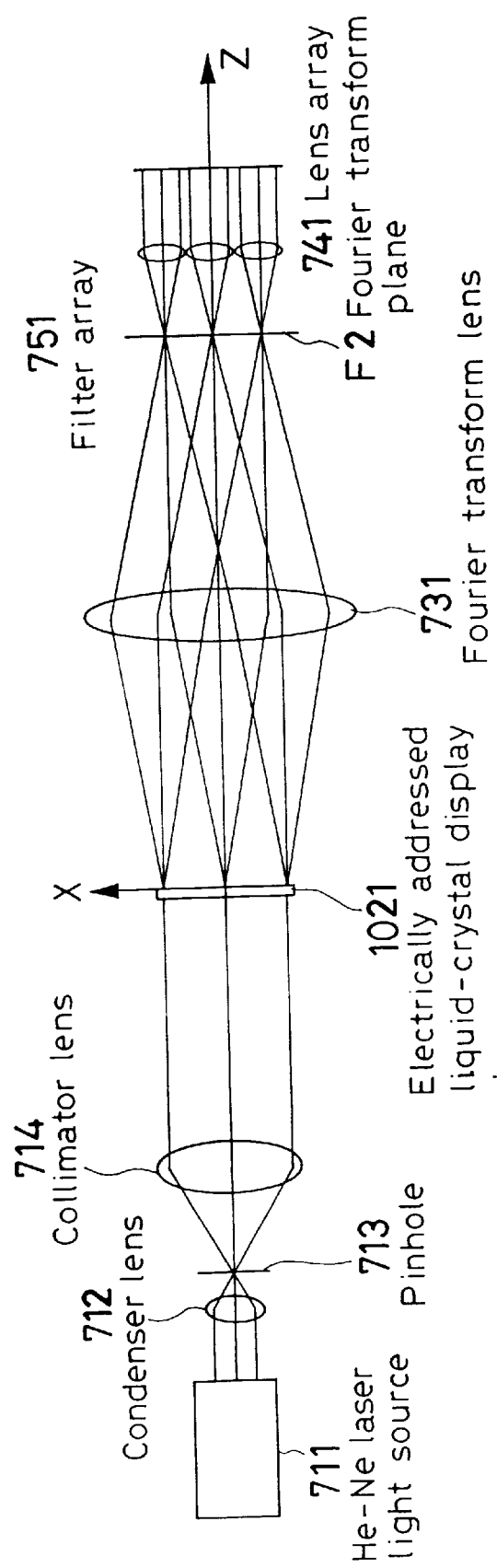
FIG. 8 is a diagram showing the arrangement of a multiplexing optical system according to a second embodiment of the present invention.

FIG. 8 shows an optical system according to a second embodiment of the present invention. This embodiment differs from the first embodiment in that a transmission type electrically addressed liquid-crystal display device in which pixels as its smallest display units are arrayed in a square configuration is used in place of the combination of a film and a grating member used as an input image display device in the first embodiment. The arrangement of the rest of this embodiment is the same as that of the first embodiment.

Figure 9:
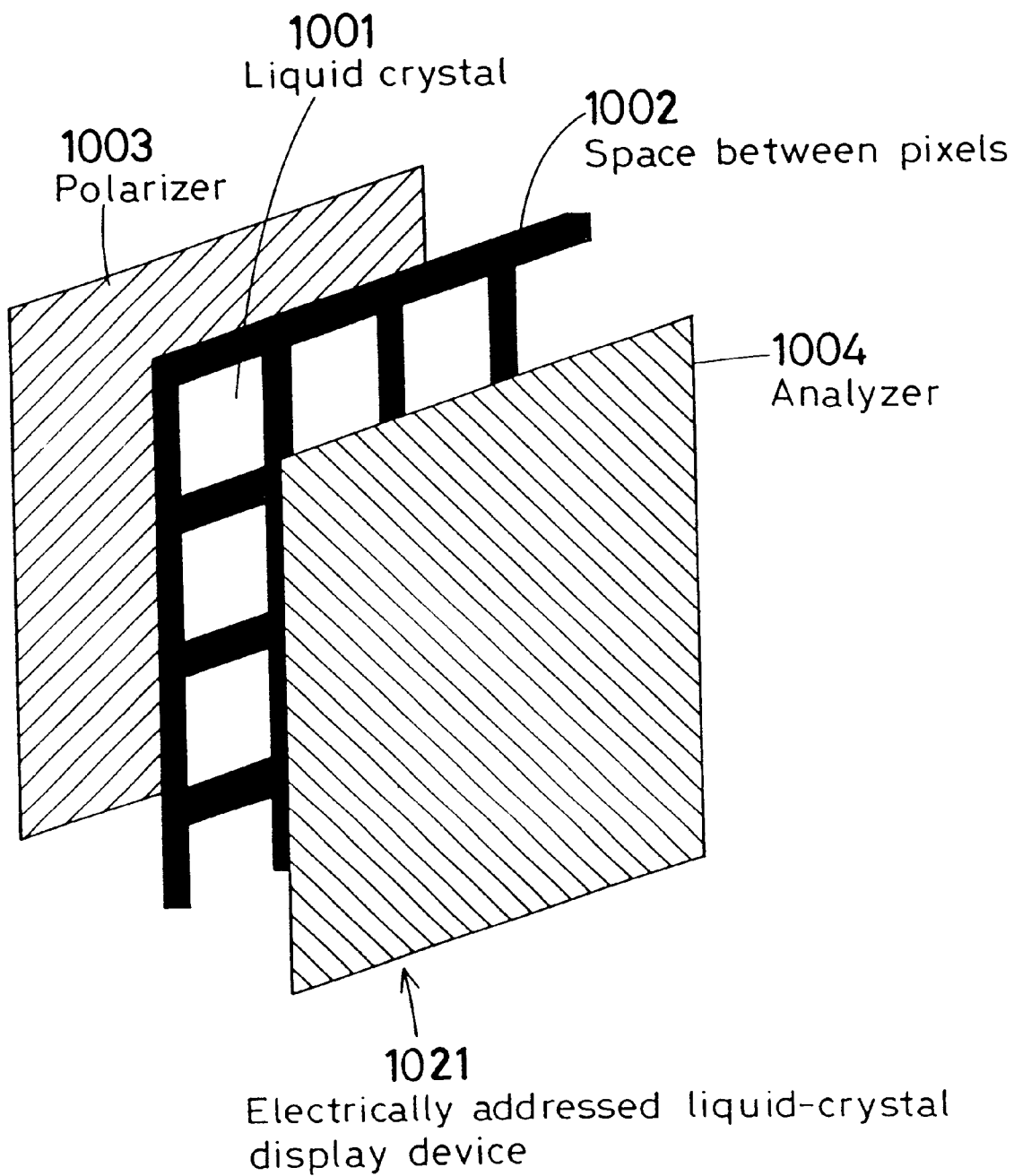
FIG. 9 is a perspective view showing the arrangement of an electrically addressed liquid-crystal display device used in the second embodiment.

As shown in FIG. 8, a parallel-beam generating device includes a He—Ne laser light source 711, a condenser lens 712, a pinhole 713, and a collimator lens 714 as in the case of the first embodiment. An approximately parallel light beam produced by the parallel-beam generating device enters a transmission type electrically addressed liquid-crystal display device 1021 on which an input image to be filtered is displayed. As shown in FIG. 9, the electrically addressed liquid-crystal display device 1021 changes the polarization direction of light inputted to pixels thereof, which are the smallest display units, by using electric signals. More specifically, the electrically addressed liquid-crystal display device 1021 has a polarizer 1003 and an analyzer 1004, which are placed in front of and behind a liquid crystal 1001, and consequently changes the transmittance of incident light. In this embodiment, each pixel is formed from a square liquid crystal, and the pixels are arrayed in a square configuration. An electric circuit, wiring, and so forth for controlling the liquid crystal 1001 are disposed in a space 1002 between the pixels. Accordingly, the light beam passing through the transmission type electrically addressed liquid-crystal display device 1021 reads the input image displayed thereon and is further diffracted by the pixels of the liquid-crystal display device 1021 which act as a grating because the pixels have approximately the same shape and are arrayed in a square configuration at approximately equal intervals. In other words, the electrically addressed liquid-crystal display device 1021 has both the filter and grating actions in the first embodiment. Consequently, the light beam reading the input image propagates in the direction of each order of diffraction. The light beam propagating in the direction of each order of diffraction passes successively through the Fourier transform lens 731, the filter array 751 and the lens array 741, thereby obtaining a plurality of filtered images as in the case of the first embodiment.

The filter array 751 is formed by using wavelet filters. It is generally apparent that wavelet filters can handle a time-series signal, etc. A wavelet filter is expressed by $$W(a,b,x_n,y_n) = 1/\sqrt{(ab)} \times \int\int f(x,y) h^*((x-x_n)/a, (y-y_n)/b) dx dy \quad (12)$$

The filter array 751 is formed by using filters h(x,y) in which variables a, b, $x_n$, and $y_n$ in expression (12) are properly changed.

In a case where a liquid-crystal display device is used as an input image display device as in this embodiment, if the size of each pixel is assumed to be d, the grating interval is also d. Assuming that n×n pixels are assigned as the smallest display units of the liquid-crystal display device to a unit picture element of an image to be displayed, the maximum spatial frequency $N_{max}$ of the input image displayed on the input image display device is given by $N_{max}=1/nd$. Accordingly, Eq.(4) may be replaced by $$n \geq 2 \quad (4\text{-}1)$$

This is equivalent to assigning 2×2 pixels as the smallest display units of the liquid-crystal display device to one picture element constituting an image to be displayed.

Specific Example 2-1

A specific example for realizing a modification of the second embodiment will be shown below. The wavelength used in this example was He—Ne laser light of wavelength 633 nanometers. The focal length $F_f$ of the Fourier transform lens was 200 millimeters. Because a transmission type electrically addressed liquid-crystal display device was used as an input image display device, the size d of one picture element was 40 micrometers.

As has been stated above, if at least 2×2 pixels are assigned as the smallest display units of the liquid-crystal display device to one picture element constituting an image to be displayed, Eq.(4) is satisfied. Therefore, in this example, 2×2 pixels were assigned to each picture element.

Further, in this example, the size W of the input image was 20 millimeters, and the grating pitch d was 40 micrometers. Hence, $N_{max}=1/(0.04\times 2\times 2)=6.251$ line pairs per millimeter, and $F_{a2} \leq 7.9125$ millimeters was obtained from Eq.(7). In this example, $F_{a2}$ was set equal to 7.9 millimeters. Thus, it was possible to reproduce a plurality of images from the input image without any lacking information.

Third embodiment

Figure 10:
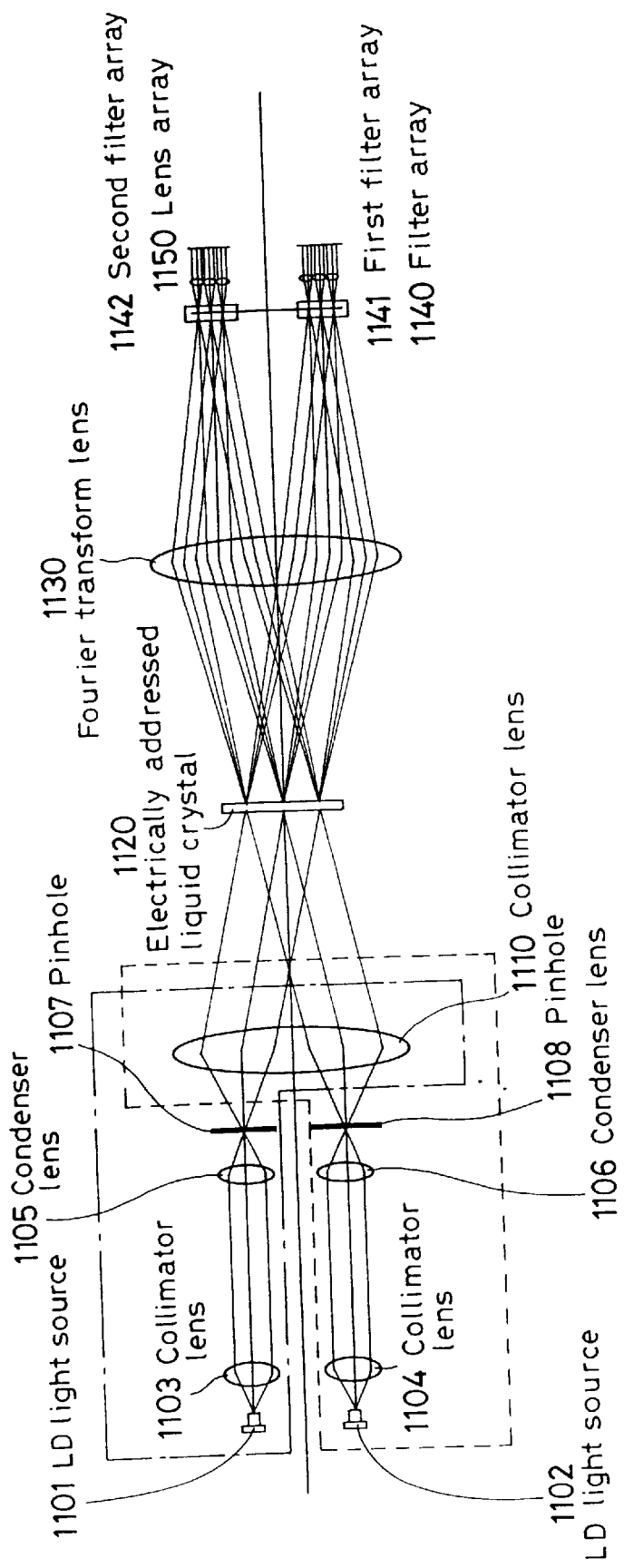
FIG. 10 is a diagram showing the arrangement of a multiplexing optical system according to a third embodiment of the present invention.

FIG. 10 shows an optical system according to a third embodiment of the present invention. This embodiment corresponds to the arrangement shown in FIG. 3, in which an image displayed on an input image display device is read by using a plurality of light sources.

In this embodiment, there are two parallel-beam generating devices, i.e. a first parallel-beam generating device and a second parallel-beam generating device. The first parallel-beam generating device includes an LD (laser diode) light source 1101, a collimator lens 1103, a condenser lens 1105, a pinhole 1107, and a collimator lens 1110. The second parallel-beam generating device includes an LD light source 1102, a collimator lens 1104, a condenser lens 1106, a pinhole 1108, and a collimator lens 1110. The input image display device is an electrically addressed transmission type liquid-crystal display device 1120 as in the case of the second embodiment. In the first parallel-beam generating device, divergent light emitted from the LD light source 1101 is formed into an approximately parallel light beam by the collimator lens 1103 and condensed by the condenser lens 1105. Then, the light beam passes the aperture of the pinhole 1107, which is disposed in the front focal plane of the collimator lens 1110, and further passes through the collimator lens 1110 to become approximately parallel collimated light having a size sufficiently large to read the image displayed on the input image display device. In the second parallel-beam generating device also, a light beam emitted from the LD light source 1102 passes successively through the collimator lens 1104, the condenser lens 1106, the pinhole 1108 and the collimator lens 1110 to become approximately parallel collimated light having a size sufficiently large to read the image displayed on the input image display device. Because the pinholes 1107 and 1108 are each disposed so as to coincide with the front focal point of the collimator lens 1110, the parallel light beams produced from the two parallel-beam generating devices illuminate simultaneously at different angles the area of the input image displayed on the electrically addressed liquid-crystal display device 1120, which is disposed in the back focal plane of the collimator lens 1110 as an input image display device. Accordingly, the light beams read at different angles the input image displayed on the electrically addressed liquid-crystal display device 1120. Further, light is propagated in various diffraction directions by the action of the electrically addressed liquid-crystal display device 1120 with respect to each direction in which the input image is read out, as shown in the second embodiment.

The light beams propagating in various directions pass through a Fourier transform lens 1130 disposed such that the front focal plane thereof is coincident with the electrically addressed liquid-crystal display device 1120. Thus, the light beams form a plurality of Fourier transformed images on the plane of a filter array 1140 disposed in the back focal plane of the Fourier transform lens 1130. The Fourier transformed images are filtered by the respective filters of the filter array 1140. The filtered light beams pass through a lens array 1150 to form convolution images on the reproducing plane as a result of convolution of the input image with the filters.

The filter array 1140 includes a first filter array 1141 for the light beam from the first parallel-beam generating device and a second filter array 1142 for the second parallel-beam generating device. The first filter array 1141 uses Gabor filters, whereas the second filter array 1142 uses wavelet filters.

Accordingly, the number of convolution images obtained is increased by using a plurality of parallel-beam generating devices. Moreover, because the first and second parallel-beam generating devices are incoherent to each other, even if there is overlapping of images, it is possible to obtain favorable images because there is no interference between the light beams.

Specific Example 3-1

A specific example for realizing a modification of the third embodiment will be shown below. The wavelength λ used in this example was 690 nanometers of light from the laser diode. The focal length $F_f$ of the Fourier transform lens was 250 millimeters. Because a transmission type electrically addressed liquid-crystal display device was used as an input image display device, the size of one pixel of the liquid-crystal display device was equal to the grating pitch d. In this example, d=50 micrometers. If at least 2×2 pixels are assigned as the smallest display units of the liquid crystal display device to one picture element constituting an image to be displayed, Eq.(4) is satisfied as in the case of the specific example 2-1 of the second embodiment. Therefore, in this example, 3×3 pixels were assigned to each picture element.

Further, in this example, the size W of the input image was 30 millimeters, and the grating pitch d was 50 micrometers. Hence, $N_{max}=1/(0.05\times3\times2)=3.333$ line pairs per millimeter, and $F_{a2}<23.9$ millimeters was obtained from Eq.(7). In this example, $F_{a2}$ was set equal to 20 millimeters. Thus, it was possible to reproduce a plurality of images from the input image without any lacking information.

Fourth Embodiment

Figure 11:
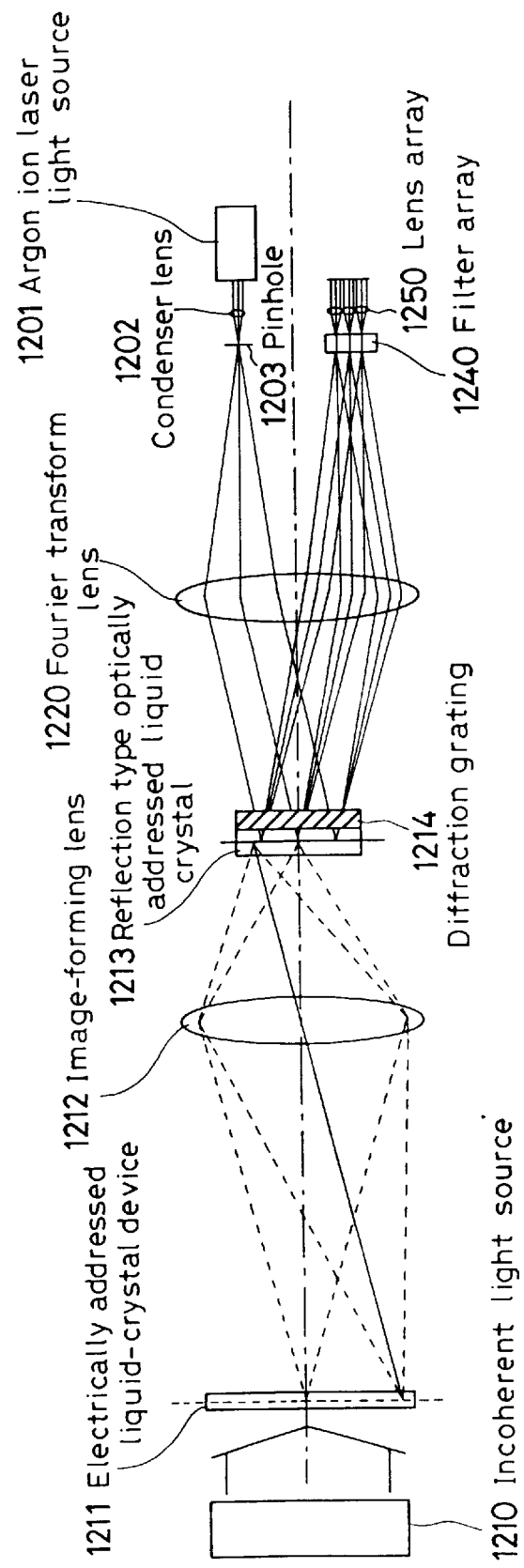
FIG. 11 is a diagram showing the arrangement of a multiplexing optical system according to a fourth embodiment of the present invention.
Figure 12:
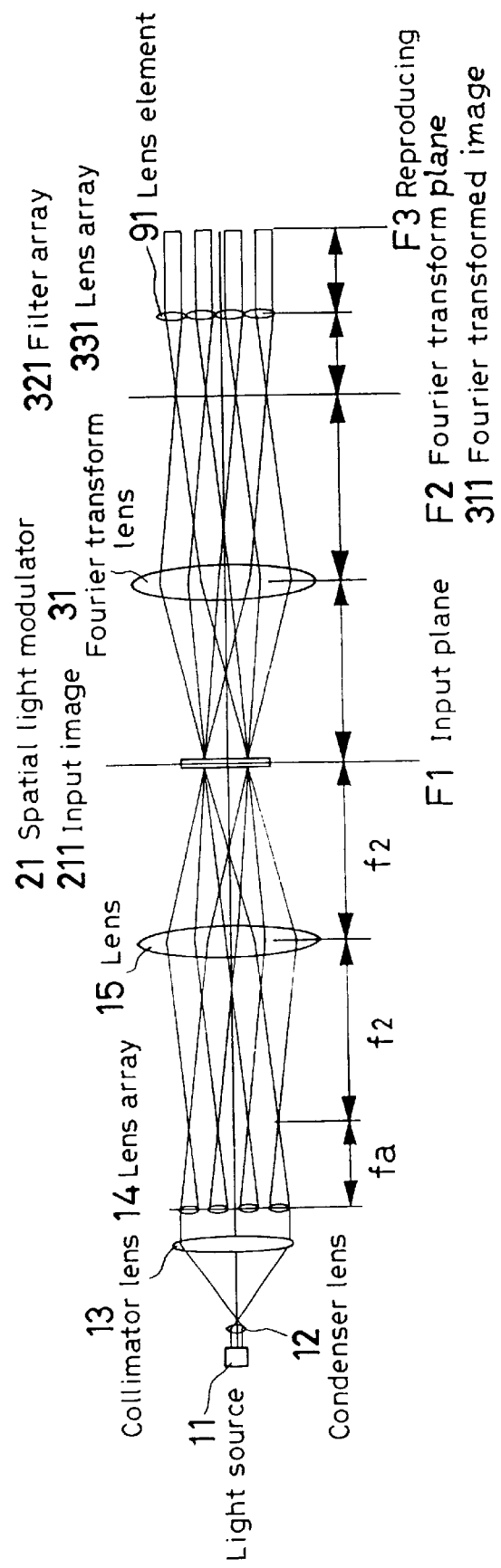
FIG. 12 is a diagram showing the arrangement of a conventional multiplexing optical system.
Figure 13:
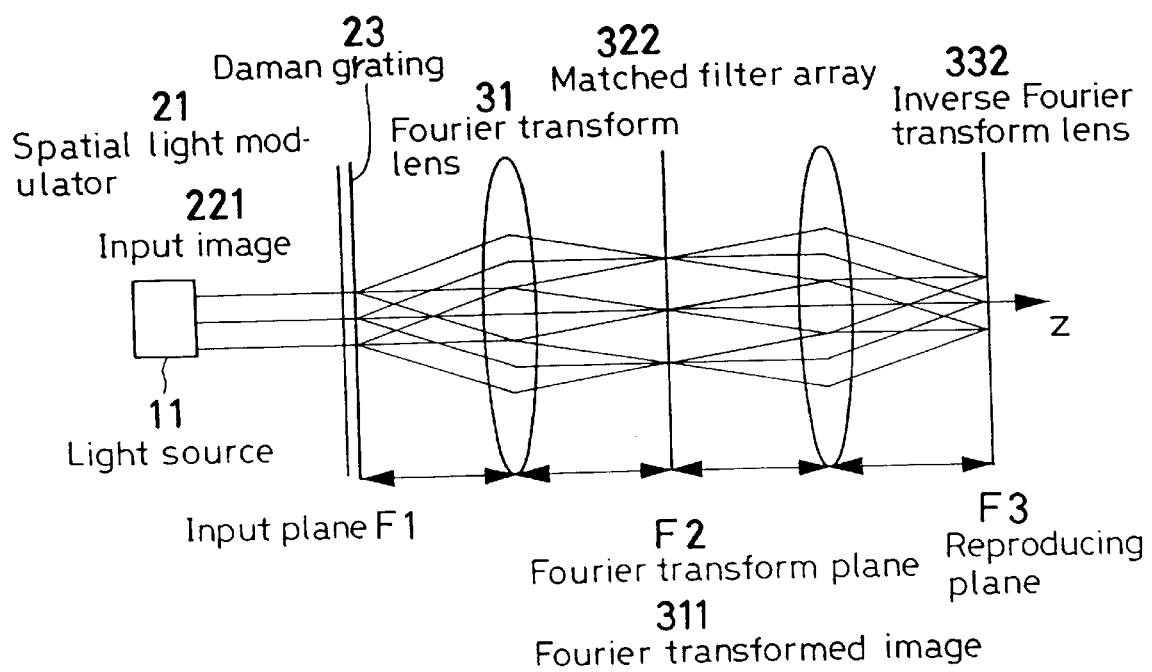
FIG. 13 is a diagram showing the arrangement of another conventional multiplexing optical system.

FIG. 11 shows an optical system according to a fourth embodiment of the present invention. This embodiment differs largely from the foregoing embodiments in that an input image display device includes an electrically addressed liquid-crystal device 1211, an incoherent light source 1210, an image-forming lens 1212, a reflection type optically addressed liquid crystal 1213, and a Damman diffraction grating 1214 as a grating member as stated in the first embodiment.

A parallel-beam generating device includes an argon ion laser light source 1201, a condenser lens 1202, a pinhole 1203, and a Fourier transform lens 1220. Collimated light emitted from the argon ion laser light source 1201 is condensed by the condenser lens 1202, and a part of the light beam passes through the pinhole 1203 disposed at a position where the light is condensed. The light beam passing through the pinhole 1203 passes through the Fourier transform lens 1220 to form an approximately parallel collimated light beam because the pinhole 1203 is disposed in the front focal plane of the Fourier transform lens 1220.

Meanwhile, in the input image display device, the input image displayed on the electrically addressed liquid-crystal device 1211 is read by incoherent light from the incoherent light source 1210. The light reading the input image passes through the image-forming lens 1212 which is disposed such that the display surface of the electrically addressed liquid-crystal device 1211 and the written surface of the reflection type optically addressed liquid crystal 1213 are in a reduction image-formation relationship to each other. Thus, the input image is formed on the write surface of the reflection type optically addressed liquid crystal 1213 in the form of a reduced image.

The reduced input image is read by the light beam from the Fourier transform lens 1220, which is disposed such that the read surface of the reflection type optically addressed liquid crystal 1213 is coincident with the back focus position of the Fourier transform lens 1220. The light beam reading the input image is diffracted by the Damman diffraction grating 1214, which is disposed immediately in front of the read surface of the reflection type optically addressed liquid crystal 1213, thereby forming a plurality of Fourier transformed images on the plane of a filter array 1240, which lies in the Fourier transform plane of the Fourier transform lens 1220, as in the case of the foregoing embodiments.

In this embodiment, the filter array 1240 is formed by using Gabor filters. Thus, convolution images as a result of the convolution of the input image with the Gabor filters are obtained on the reproducing plane through a lens array 1250 as in the case of the foregoing embodiments.

Although in the above-described embodiments liquid-crystal display devices are used as display devices, various other display devices are also usable, e.g. crystal display devices, organic display devices, or digital mirror devices. Although in the foregoing embodiments a Damman diffraction grating is shown as a grating member which is latticed both vertically and horizontally, it is also possible to use other diffraction gratings such as amplitude type or phase type diffraction gratings.

Although in the foregoing embodiments two types of filters, e.g. Gabor and wavelet filters, are shown as filters, it is also possible to use various other filters, for example, filters formed by binalizing Gabor or wavelet filters using an appropriate threshold value, or simple spatial frequency filters. Further, light sources used in the parallel-beam generating devices are not necessarily limited to He—Ne lasers and LD light sources as shown in the foregoing embodiments, but other light sources are also usable. It is also possible to use an incoherent light source by reducing the apparent size of the light source.

If data concerning the filtered convolution images obtained in the foregoing various embodiments is inputted to a recognition system, e.g. a neural network, it is possible to effect a higher level of recognition or identification, for example.

As will be clear from the foregoing description, the multiplexing optical system according to the present invention makes it possible to obtain a plurality of reproduced images subjected to a plurality of filtering operations by using only one parallel light beam which is incident on the input image display device. Accordingly, alignment is extremely facilitated. Further, it becomes possible to use frequency cutoff filters, for example, those which use apertures, in place of holographic filters. Accordingly, there is no overlapping of a plurality of reproduced images, and each reproduced image has a sufficiently large amount of light. In addition, there is no image reproduced on the reproducing plane by zero-order diffracted light as occurs in the case of a holographic filter. Therefore, the reproducing plane can be effectively utilized.

What we claim is:

1. A multiplexing optical system, comprising:
   a parallel light beam generating device constructed and arranged to generate an approximately parallel light beam;
   an image display device located in the approximately parallel light beam from the parallel light beam generating device, wherein said image display device displays an input image;
   a grating device constructed and arranged to diffract the light beam via the image display device to produce a plurality of diffracted light beams;
   a Fourier transform lens constructed and arranged to form a plurality of Fourier transformed images of the input image by receiving the diffracted light beams from the grating device; and
   a lens array constructed and arranged to perform an inverse Fourier transform on the plurality of Fourier transformed images, each lens corresponding to one of the plurality of Fourier transformed images and the inverse Fourier transformed images are non-overlapping.

2. A multiplexing optical system according to claim 1, further comprising:
   a filter array constructed and arranged to filter the plurality of Fourier transformed images, each filter corresponding to one of the plurality of Fourier transformed images.

3. A multiplexing optical system according to claim 2, wherein the filter array is a Gabor filter array.

4. A multiplexing optical system according to claim 2, wherein the filter array is a wavelet filter array.

5. A multiplexing optical system according to claim 1, wherein the input image and grating device satisfy the following condition:

$$2N_{max} \times d \leq 1$$

where $N_{max}$ is a maximum spatial frequency of the input image in a predetermined direction, and d is a grating pitch of the grating device in a direction corresponding to the predetermined direction.

6. A multiplexing optical system according to claim 1, wherein said image display device is pixels of a liquid crystal display, and said grating device is a structure between pixels of the liquid crystal display.

7. A multiplexing optical system comprising:
   a plurality of light beam generating devices, each said light beam generating device generating an approximately parallel light beam;
   an image display device located in the parallel light beams from the plurality of light beam generating devices, wherein said image display device displays an input image;
   a grating device constructed and arranged to diffract the light beam via the image display device to produce a plurality of diffracted light beams;
   a Fourier transform lens constructed and arranged to form a plurality of Fourier transformed images of the input image by receiving the diffracted light beams from the grating device; and
   a lens array constructed and arranged to perform an inverse Fourier transform on the plurality of Fourier transformed images, each lens corresponding to one of the plurality of Fourier transformed images and the inverse Fourier transformed images are non-overlapping.

8. A multiplexing optical system according to claim 7, further comprising:
   a filter array constructed and arranged to filter the plurality of Fourier transformed images, each filter corresponding to one of the Fourier transformed images.

9. A multiplexing optical system according to claim 8, wherein the filter array is a Gabor filter array.

10. A multiplexing optical system according to claim 8, wherein the filter array is a wavelet filter array.

11. A multiplexing optical system according to claim 7, wherein the input image and grating device satisfy the following condition:

$$2N_{max} \times d \leq 1$$

where $N_{max}$ is a maximum spatial frequency of the input image in a predetermined direction, and d is a grating pitch of the grating device in a direction corresponding to the predetermined direction.

12. A multiplexing optical system according to claim 7, wherein said image display device is pixels of a liquid crystal display, and said grating device is a structure between pixels of the liquid crystal display.

13. A multiplexing optical system, comprising:
   a parallel light beam generating device constructed and arranged to generate an approximately parallel light beam;
   an image display device located in the approximately parallel light beam from the parallel light beam generating device, wherein said image display device displays an input image;
   a grating device constructed and arranged to two-dimensionally diffract the light beam via the image display device to produce a plurality of diffracted light beams;
   a Fourier transform lens constructed and arranged to form a plurality of Fourier transformed images of the input image by receiving the diffracted light beams from the grating device; and
   a lens array constructed and arranged to perform an inverse Fourier transform on the plurality of Fourier transformed images, each lens corresponding to one of the plurality of Fourier transformed images and inverse Fourier transformed images are non-overlapping.

14. A multiplexing optical system according to claim 13, further comprising:
   a filter array constructed and arranged to filter the plurality of Fourier transformed images, each filter corresponding to one of the Fourier transformed images.

15. A multiplexing optical system according to claim 14, wherein the filter array is a wavelet filter array.

16. A multiplexing optical system according to claim 13, wherein the input image and grating device satisfy the following condition:

$$2N_{max} \times d \leq 1$$

where $N_{max}$ is a maximum spatial frequency of the input image in a predetermined direction, and d is a grating pitch of the grating device in a direction corresponding to the predetermined direction.

17. A multiplexing optical system according to claim 13, wherein said image display device is pixels of a liquid crystal display, and said grating device is a structure between pixels of the liquid crystal display.

18. A multiplexing optical system, comprising:
   parallel light beam generating means for generating an approximately parallel light beam;
   image display means for displaying an input image, the image display means being located in the parallel light beam from the parallel light beam generating means;
   grating means for diffraction the light beam via the image display means to produce a plurality of diffracted light beams;
   Fourier transform means for forming a plurality of Fourier transformed images of the input image by receiving the diffracted light beams from the grating means; and
   lens array means for performing an inverse Fourier transform on the plurality of Fourier transformed images, each lens corresponding to one of the plurality of Fourier transformed images and the inverse Fourier transformed images are non-overlapping.

* * * * *